No. 85,916. W. A. DITSON. PATENTED JAN. 19, 1869.
REELING AND MEASURING YARN.

Witnesses.
Inventor.

WILLIAM A. DITSON, OF GIRARD, ILLINOIS.

Letters Patent No. 85,916, dated January 19, 1869.

IMPROVEMENT IN REELING AND MEASURING YARN.

The Schedule referred to in these Letters Patent and making part of the same.

*To all whom it may concern:*

Be it known that I, WILLIAM A. DITSON, of Girard, in the county of Macoupin, and State of Illinois, have made certain new and useful Improvements in Combined Yarn-Reel and Meter; and I do hereby declare that the following is a full and clear description thereof, reference being had to the accompanying drawings, and to the letters of reference marked thereon.

The object of this invention is to construct a reel for winding yarn, thread, &c., into skeins, and at the same time automatically counting the number of strands in the skein, and thereby measuring the contents thereof.

To enable those skilled in the art to make and use my improved reel, I will proceed to describe its construction and operation.

Figure 1, of the drawings, is a side elevation of the apparatus.

Figure 1:
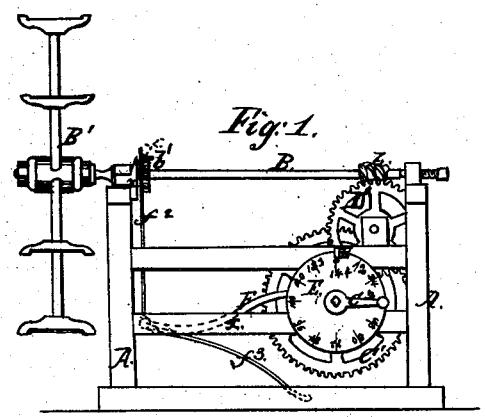
Figure 2:
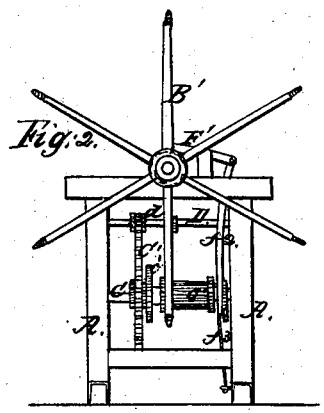
Figure 2 is a front-end elevation.
Figure 3:
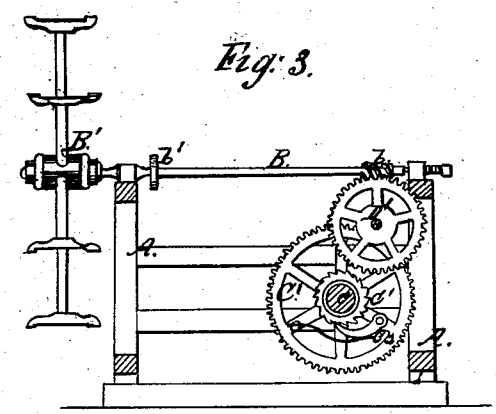
Figure 3 is a longitudinal sectional elevation.
Figure 4:
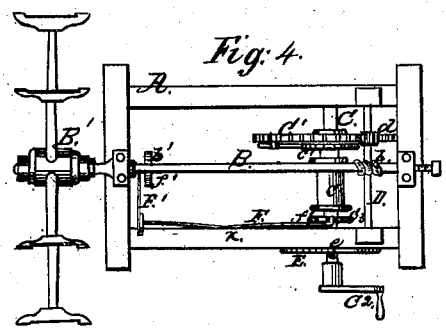
Figure 4 is a top plan.

The frame A may be of any suitable form of construction, and in the top part of it bearings will be provided for the reel-axle B.

On the front end of this axle the reel B' is located, and is revolved by it.

A driving-shaft, C, is furnished with bearings at some convenient location on the rear end of the frame A.

A loose cog-wheel, $C^1$, is placed on the said shaft C, and also a weight-drum, $c$, and a ratchet, $c^1$.

A spring-pawl, $c^2$, is attached to the side of the cog-wheel $C^1$, and gears into the said ratchet.

The cog-wheel $C^1$ gears into the pinion $d$, on the counter-shaft D, and communicates motion to it.

The counter-wheel D', on the same shaft, gears into the endless screw $b$, on the rear end of the axle B.

The drum $c$ and ratchet $c^1$ are securely fixed to the shaft C, and revolved with it.

A weight (not shown) is to be attached to the drum $c$, by means of a cord, which is to be wound up around the said drum, by turning it around by means of the crank $C^2$, applied to the outer end of the shaft C.

While the weight-cord is being wound up around the drum, the cog-wheel $C^1$ will remain stationary, but as soon as the weight is allowed to act upon the drum, to turn it, the pawl $c^2$ will come in contact with teeth of the ratchet, and thus communicate motion to the wheel $C^1$, and, through it, to all other operative parts of the machine.

The size of the various cog-wheels, and the number of cogs in them, and the relative proportions of the screw-threads $b$, should be so computed that for every revolution of the shaft C, the reel B' will make a certain fixed number of revolutions, which number will be a multiple of the revolutions made by the shaft C in any given time—say ten or twelve times as many.

In connection with the shaft C there is a graduated disk E, either affixed to the said shaft or to the frame A.

If this disk be affixed to the shaft, then it will revolve with the shaft, and a stationary finger, $e$, will be used to point to the required figures on the index-disk; but if the disk be made stationary, then a movable finger, attached to the shaft C, must be used.

The face of the disk will be graduated into equal parts, and the graduation-points properly numbered.

These graduation-marks will bear a certain fixed relation to the revolutions of the axle B, and will exhibit at a glance the number of revolutions made by the reel.

As this machine is to be automatic in its operations, and is actuated by the weighted drum already alluded to, it will be necessary to devise means to stop it automatically. This is accomplished by means of the toothed levers F F'.

The lever F is pivoted to the frame A at $x$, and a tooth, $f$, on its outer end, is arranged to drop into a notch in the collar $c^3$, which is affixed to the shaft C.

In like manner the lever F' is pivoted to the frame A at $x'$, and its tooth, $f^1$, is allowed to drop into a notch in the collar $b'$, on the shaft B.

The two contiguous ends of the levers F F' are connected together by means of the link $f^2$, so that they are operated in harmony with each other.

As there is but one notch each in the collars $c^3$ and $b$, it is evident that the teeth $f$ and $f^1$ can only fall into the said notches when both of the notches simultaneously fall below the said teeth $f$ and $f^1$, and this can only occur when the shaft C has made one complete revolution, and the shaft B has likewise completed a certain fixed number of revolutions.

As the levers are forced down into their notches by means of the spring $f^3$, they will fall into them as soon as both notches fall directly below the said teeth $f$ and $f^1$, and the machine will, in this manner, be automatically stopped.

For convenience' sake, the size of the reel should be one or more yards, or even fractional parts of a yard, in circumference, and the gearing of the machine so computed that, for every revolution of the index-finger, either a whole skein, or a certain fractional portion thereof, will be completed.

Having described my invention,

What I claim, is—

1. The combination of the reel, its shaft and worm, with the shaft C, drum $c$, ratchet $c^1$, wheel $C^1$, pawl $c^2$, and meter-attachment E $e$, the said wheel $C^1$ and reel-shaft being connected, as shown, and arranged to operate substantially as and for the purpose set forth.

2. The levers F F' and rod $f^2$, when combined with the collars $b'$ and $c^3$ in the manner herein shown and described.

WILLIAM A. DITSON.

Witnesses:
GEO. W. HERBERT,
M. RANDOLPH.